United States Patent
Brebner et al.

(10) Patent No.: US 6,839,780 B2
(45) Date of Patent: Jan. 4, 2005

(54) CONNECTION DEVICE FOR A COMPUTER

(75) Inventors: Gavin Brebner, St. Martin d'Uriage (FR); Francois-Xavier Lecarpentier, Sassenage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/350,299

(22) Filed: Jan. 21, 2003

(65) Prior Publication Data

US 2003/0169570 A1 Sep. 11, 2003

(30) Foreign Application Priority Data

Jan. 25, 2002 (EP) ............................................ 02354017

(51) Int. Cl.[7] .............................................. G06K 11/08
(52) U.S. Cl. .............................. 710/62; 710/63; 710/2; 710/8; 710/10
(58) Field of Search ............................... 710/62, 8, 15, 710/63, 64, 16, 2, 1, 10; 385/25, 58, 70

(56) References Cited

U.S. PATENT DOCUMENTS

| | | | | |
|---|---|---|---|---|
| 4,113,353 A | | 9/1978 | Matsushita | 350/171 |
| 4,364,035 A | * | 12/1982 | Kirsch | 345/166 |
| 4,418,278 A | | 11/1983 | Mondshein | 235/487 |
| 5,784,511 A | * | 7/1998 | Kikuchi et al. | 385/57 |
| 5,914,709 A | | 6/1999 | Graham et al. | 345/179 |
| 5,959,752 A | * | 9/1999 | Ota | 398/119 |
| 6,206,578 B1 | * | 3/2001 | Shin et al. | 385/54 |
| 6,230,214 B1 | * | 5/2001 | Liukkonen et al. | 710/1 |
| 6,362,841 B1 | * | 3/2002 | Nykanen | 345/835 |
| 6,502,997 B1 | * | 1/2003 | Lee et al. | 385/88 |
| 2002/0149905 A1 | * | 10/2002 | Jackson | 361/681 |
| 2003/0169570 A1 | * | 9/2003 | Brebner et al. | 361/715 |

FOREIGN PATENT DOCUMENTS

| | | | | |
|---|---|---|---|---|
| EP | 0 546 704 A2 | | 6/1993 | |
| EP | 001331593 A1 | * | 7/2003 | G06K/11/08 |
| JP | 11-194861 | * | 7/1999 | G02B/6/42 |
| JP | 2000-194444 | * | 7/2000 | G06F/1/16 |
| JP | 2000-222083 | * | 8/2000 | G06F/3/00 |

OTHER PUBLICATIONS

Infrared Data Association Plug and Play Extensions to Link Management Protocol, Infrared Data Association, Version 1.1, Jan. 1996.*

* cited by examiner

*Primary Examiner*—Fritz Fleming

(57) ABSTRACT

A connection device for a computer comprising an optical connection part and an input/output controller, the optical connection part comprising a plurality of optical fibres embedded in a substrate, each fibre extending from a coupling end associated with an operative surface of the substrate and a connection end, the input/output controller comprising a plurality of light detectors and a plurality of light emitters, wherein the connection end of each optical fibre is associated with at least one light emitter and/or at least one light detector, characterised in that the input/output controller is operable to receive a message from a peripheral device located adjacent the operative surface, the message being transmitted via the optical connection part, the message comprising an identifier associated with the peripheral device.

28 Claims, 4 Drawing Sheets

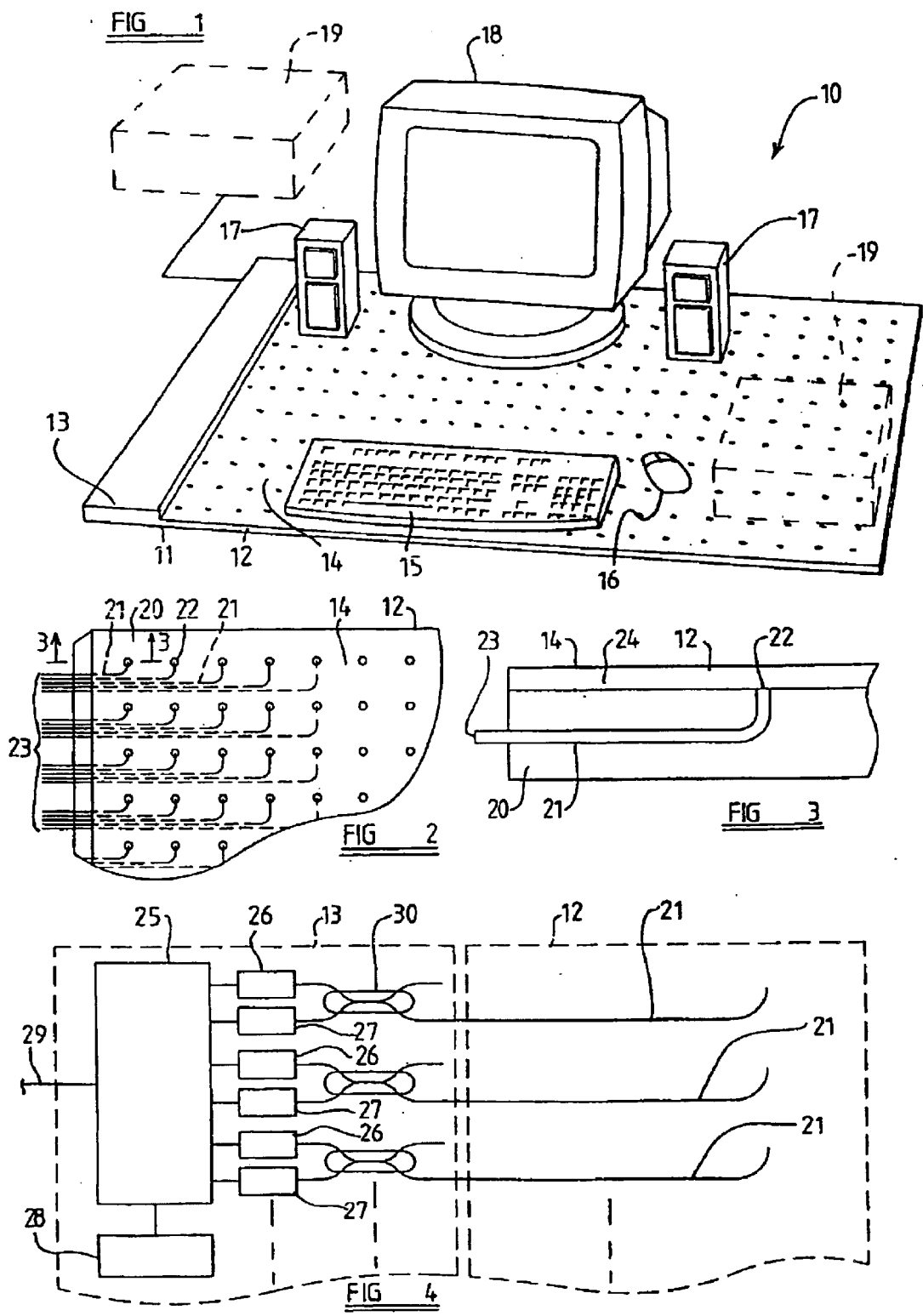

CONNECTION DEVICE FOR A COMPUTER

FIELD OF INVENTION

The invention relates to a connection device for a computer, and a peripheral device and a computer system.

BACKGROUND OF THE INVENTION

A personal computer conventionally comprises a plurality of separate elements, which perform input, output and processing functions. In a desktop personal computer, these comprise for example the processor unit, a visual display unit (VDU) a keyboard, mouse and any other manual input devices as desired, and any other separate elements or peripherals to provide additional functions as required, for example speakers, printers etc. Conventionally, such elements are connected by appropriate cables. Such connections are however disadvantageous in that each cable requires at least one mechanical coupling or linkage which may be prone to wear or damage, the position of each element is naturally limited by the length of its associated cable, and, where a large number of elements or peripherals are provided, the resulting bundle of cables may be complex and unsightly.

The use of optical fibres to permit the transmission of signals in the form of modulated light levels or light pulses is well known. In U.S. Pat. No. 4,418,278, an input/output device is disclosed in which a page is provided with embedded optical fibres which are used either to transmit light from a suitable emitter to the surface of the page, or to receive light from the surface of the page and transmit the light to a suitable detector. In U.S. Pat. No. 4,418,278, a simple position indicating device is shown comprising a light pen. In a first alternative, the light pen comprises a light detector, and light is transmitted through each of the embedded fibres in turn. The timing of an optical pulse is detected by the pen indicates the pen position on the page. In an alternative, the pen comprises a light emitter. Light emitted by the pen is coupled into one of the fibres and detected by the detector corresponding to that fibre. Since the position of the fibre end is known, the position of the light pen is therefore also known. Such a system however only permits the use of a single, relatively simple pointing device.

An aim of the invention is to provide a new or improved communication device for a computer.

SUMMARY OF THE INVENTION

According to a first aspect of the invention, we provide a connection device for a computer comprising a connection part and an input/output controller, the connection part comprising a plurality of optical fibres embedded in a substrate, each fibre extending from a coupling end associated with an operative surface of the substrate and a connection end, the input/output controller comprising a plurality of light detectors and a plurality of light emitters, wherein the connection end of each optical fibre is associated with at least one light emitter and/or at least one light detector, characterised in that the input/output controller is operable to receive a message from a peripheral device located adjacent the operative surface, the message being transmitted via the connection part, the message comprising an identifier associated with the peripheral device.

The input/output controller may be operable to record the peripheral device identifier and the optical fibre on which the message was transmitted.

The input/output controller may be operable to derive the physical location of the peripheral device on the operative surface of the connection part.

The input/output controller may be operable to transmit an output to the peripheral device by controlling a light emitter to transmit the output on the optical fibre associated with the peripheral device.

The input/output controller may be operable to maintain a mapping between each identifier associated with a peripheral device and an optical fibre associated with that device.

The input/output controller may be operable to update the mapping in response to a change in position of the peripheral device.

The input/output controller may be operable to control a plurality of light emitters to transmit light along a plurality of optical fibres to generate a viewable optical display.

The input/output device may be operable to detect an object adjacent the operative surface by transmitting light on one or more optical fibres and detecting light reflected from an object adjacent the operative surface received on said optical fibres.

The substrate may be flexible.

According to a second aspect of the invention, we provide a peripheral device for location adjacent an operative surface, the peripheral device comprising an emitter operable to emit light towards the surface when the peripheral device is adjacent to the surface, the peripheral device being operable to transmit a message by modulating the light emitted by the light emitter, the message including an identifier identifying the peripheral device.

The peripheral device may comprise a light detector operable to detect light emitted from said operative surface when the peripheral device is adjacent the operative surface.

According to a third aspect of the invention, we provide a computer system comprising a connection device according to the first aspect of the invention and at least one peripheral device according to the second aspect of the invention.

The computer system may comprise a processor wherein the processor may be embedded in the connection device.

The computer system may comprise a plurality of peripheral devices wherein the input/output controller may be operable to receive a message from one of said peripheral devices, the message comprising destination information identifying a further peripheral device, read the destination information and identify the fibre corresponding to the further peripheral device, and transmit the message to the further peripheral device.

BRIEF DESCRIPTION OF THE DRAWINGS

An embodiment of the present invention will now be described by way of example only with reference to the accompanying drawings, wherein;

FIG. 1 is a perspective view of a computer system embodying the present invention, FIG. 2 is a partial cutaway view of part of a connection device embodying the present invention, FIG. 3 is a section on line 3—3 of FIG. 2, FIG. 4 is a diagrammatic illustration of a connection device embodying the present invention.

DESCRIPTION OF THE PREFERRED EMBODIMENTS

Figure 6A:
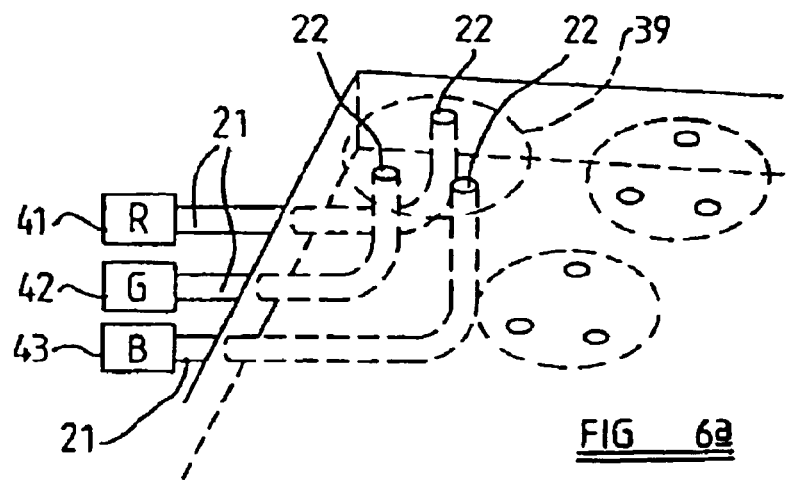
FIG. 6a is a diagrammatic illustration of an alternative embodiment of the connection device part of FIG. 2.

Referring to FIG. 1, a computer system embodying the present invention is shown at 10. The system 10 comprises a connection device 11 which comprises a connection part 12 and an input/output controller shown at 13. The connection part 12 comprises an operative surface 14 on which peripheral devices are located, in the present example comprising a keyboard 15, a mouse 16, speakers 17 and a visual display unit writer 18. A processing unit is shown at 19 connected to the input/output controller 13. The peripheral devices 15, 16, 17, 18 are able to communicate via the connection part 11 as described hereinafter.

Referring now to FIGS. 2 and 3, a part of the connection part 12 is shown. The connection part 12 comprises a flexible substrate 20 in which are embedded a plurality of optical fibres 21. Each optical fibre extends between a connection end 22 and an output end 23. The connection end 22 of each fibre 21 is associated with the operative surface 14, in the present example by bending the end of the fibre in a generally upwards direction as shown in FIG. 3 such that the connection end 22 faces in a direction generally perpendicular to the operative surface 14, such that light transmitted by the fibre 21 from the output end 23 is emitted in a direction generally perpendicular to the operative surface 14, while light directed towards the operative surface 14 is coupled to the optical fibre 21 via the connection end 22 and transmitted to the output end 23. In the present example as illustrated in FIG. 3, the operative surface 14 comprises a clear protective layer 24 disposed on the substrate 20 to protect the connection ends 22 of the fibres 21 whilst permitting the transmission of light through the protective layer 24. As illustrated in FIG. 2, the output ends 23 of each fibre 21 are disposed at an edge of the substrate 20, to permit the light to be coupled to or from each fibre 21 via the input/output controller 13.

The substrate 20 preferably comprises a flexible material which is opaque and does not attack or otherwise effect the embedded fibres, such as a settable rubber component. Although the present example comprises a regular array or grid of fibre connection ends 22, the fibre connection ends 22 may be distributed in other patterns or irregularly as desired.

Referring now to FIG. 4, where the input/output controller 13 and connection part 14, 12 are shown in part in dashed outline. In this embodiment, the input output controller 13 comprise an input/output module 25 which is connected to a plurality of light detectors 26 and a plurality of light emitters 27. The input/output module 25 is further connected to a storage medium, for example a random access memory 28 and in this example provided with an external connection 29. In this example, each optical fibre 21 is connected to a corresponding light detector 26 and a corresponding light emitter 27. Each detector 26 and emitter 27 are connected to the corresponding fibre 21 by a coupler 30 of conventional type, for example a fused biconical coupling. The light emitters may be light emitting diodes or laser diodes, or any other desired light source as appropriate. The light emitters may emit visible or non-visible light for example infra-red, as desired, and may be selected or controlled to emit, a selected wavelength or range of wavelengths. Further, different emitters may emit light at different wavelengths if desired. To reduce light losses at junctions between components, it might be envisaged that the detector 26 and emitters 27 are pigtailed, that is are directly connected to an optical fibre which in turn connected to the coupler 30 which itself is directly connected to the optical fibre 21, for example by being integrally provided or being connected by an appropriate splice, for example a fusion splice. Alternatively, if it is desired that the connection part 12 and input/output controller 13 be detachable, it might be envisaged that each fibre output end 23 is provided with an appropriate releasable fibre optic connection which is engagable in a suitable connector provided on the input/output controller 13. The input/output module 25 is operable to receive signals from each detector 26 proportional to the intensity of light falling on that detector 26, and to control the emitter 27 to transmit light along each optical fibre 21.

Figure 5:
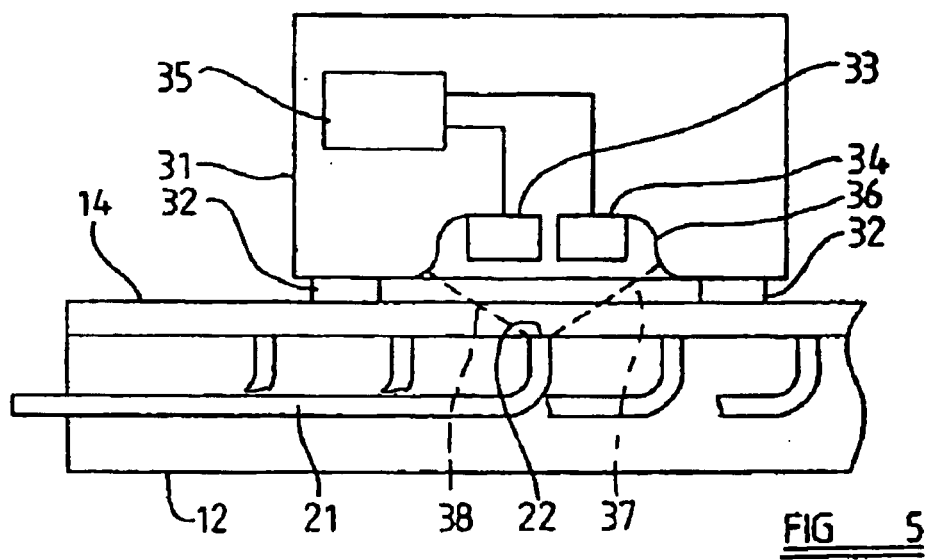
FIG. 5 is a diagrammatic illustration of a peripheral device embodying the present invention.

A peripheral device is diagrammatically shown at 31 in FIG. 5. In this example, the peripheral device 31 is disposed adjacent the operative surface 14 of the connection part 12, and supported on appropriate feet 32. The peripheral device 31 comprises a light detector 33 and a light emitter 34 disposed at a lower part of the peripheral device 31 and arranged so that the light detector 33 is operable to detect light emitted in a direction generally away from the operative surface 14, while the light emitter 34 is operable to transmit light in a direction towards the operative surface 14. The peripheral device 31 is provided with a peripheral input/output module 35 which is operable to receive a signal from the light detector 33 in response to the light falling on the detector 33, and to control the light emitter 34 to control the light intensity directed at the operative surface 14. In this example, the detector 33 and emitter 34 are located in a recess 36 protected by a window 37, but may be disposed as desired. The detector 33 and emitter 34 are preferably disposed such that they will fall within the cone of acceptance generally illustrated at 38 of an optical fibre 21 positioned below the peripheral device 31.

The system 10 operates in the following manner. When a peripheral device is placed on the operative surface 14, it transmits a message by controlling the emitter 34. The light will be coupled to a fibre 21 disposed beneath the peripheral device 31 and will be transmitted to a corresponding detector 26 in the input/output controller 13. The message comprises an identifier identifying the peripheral device 31, and optionally information which it is desired to transmit to another peripheral or part of the system 10 and further optionally a destination identifier. The message may encoded in any fashion as desired. The input/output module 25 will read the identifier and will record the optical fibre on which the message was received from the peripheral device 31 having that identifier. In this way, the input/output device will maintain a table or mapping of each peripheral device 31 and an optical fibre 21 on which a message was received from the device.

It will be apparent that where the physical location of the peripheral device 31 on the operative surface 14 is of no interest, the input/output module may simply maintain a mapping between the peripheral identifier and the detector 26 on which the message was received from that peripheral device, for example by recording a number associated with the detector. When it is then desired to transmit a message to that peripheral device the message may be sent using the emitter 27 which matches the detector 26.

In the alternative, where the position of the peripheral device 31 on the operative surface is important, for example where the peripheral device 31 comprises a mouse 16, the input/output module may maintain a mapping between each fibre 21 or detector 26 and the corresponding position on the operative surface 14 of the output end 22 of the fibre 21 corresponding to that detector 26. This mapping may alternatively be maintained by another module or software element. For example when a message is received from a mouse 16, the input/out module 20 may transmit the message to the mouse driver and add an identification of the detector at which the message was received. The mouse driver may then use its own stored mapping between detector number and physical position to derive the location of the mouse.

It will be apparent that the input/output module 25 may dynamically maintain the table of detector numbers and device identifiers. Thus, when a peripheral device 31 moves to a different position on the operative surface 14, the input/output module will receive a message from that peripheral device 31 at a different detector 26. The input/output device will consult the table to compare the detector number with the previous detector number at which a message from that peripheral device has been received, and update the table if necessary.

Equally, when it is desired to transmit a message to a peripheral device 31, whether from another peripheral device 31 or from the processor unit 19 or otherwise, the input/output module 25 will receive the message to be sent with destination information comprising the identifier of the peripheral device 31 to which the message is to be sent. By consulting the table, the input/output module 25 will retrieve the detector number 27 with which the identifier for that peripheral device 31 is associated in the table, and transmit the message to the peripheral device using the corresponding emitter 27.

In maintaining the table, it will be apparent that the input/output module 25 may be entirely passive in that the table is only maintained and updated when a message is received a from peripheral device 31. Alternatively, the input/output module 25 may poll peripheral devices 31 located on the operative surface 14, by for example sending a polling request on each fibre 21 and receiving peripheral device 31 identifiers in response to the polling request. The peripheral devices 31 may further periodically retransmit an identifier. Each mapping of peripheral device identifier and detector number in the table may be time limited, such that it expires after a certain period if no further message has been received from the respective peripheral device 31.

Figure 6B:
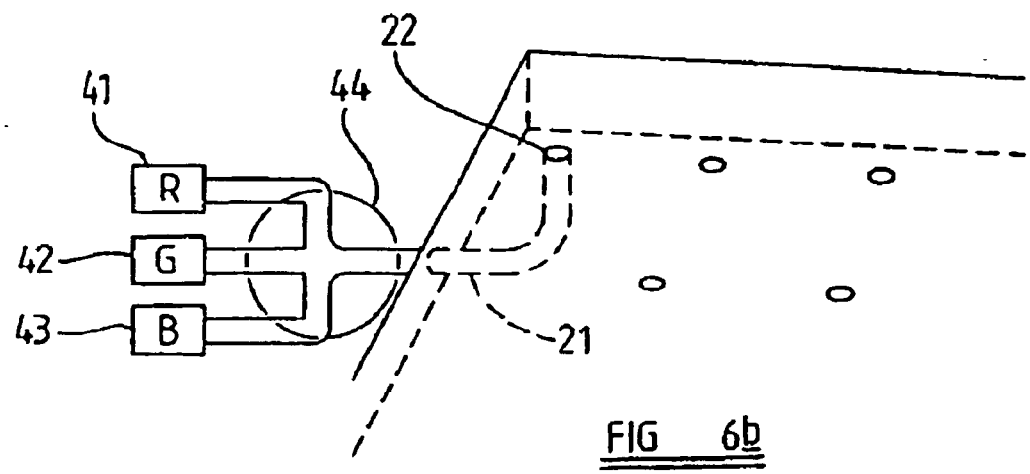
FIG. 6b is an alternative embodiment of the embodiment of FIG. 6a, FIG. 7 is a plan view of a further connection device embodying the present invention.

Since the input/output controller 13 comprises a plurality of light emitters 27, it will be apparent that light emitters 27 may be controlled not only to send messages to peripheral devices 31 located on the operative surface 14, but to provide a viewable optical display to be seen by a human operator. The viewable optical display may be provided for any function as desired, either for decoration, information display or indeed for any other purpose as desired. As shown in FIGS. 6a and 6b, a colour optical display can be provided where the connection end 22 of each optical fibre 21 comprises a pixel. To provide colour, it might be envisaged that the connection ends 22 of three optical fibres 21 are arranged in a group 39, and the fibres 21 are respectively provided with emitters 41, 42, 43 that emit red, green and blue light respectively. The group 39, if sufficiently small, will appear to the viewer to have a selected colour depending on the respective intensities of the emitters 41, 42, 43 in known manner. Alternatively, as shown in FIG. 6b the emitters 41, 42, 43 may each be coupled via a suitable coupling 44 to a single fibre 21. The light emitted from the connection end 22 of the fibre 21 will then have an apparent colour depending on the respective intensities of the light emitted from the emitters 41, 42, 43.

The input/output controller may also be operable to provide an "touch sensitive" operative surface 14. As seen in FIG. 4, each fibre 21 has a detector 26 and emitter 27 associated with it. The input/output module 25 may control the emitter to transmit light along the fibre 21 and may monitor the signal from each detector 26. When an object, for example a finger, is placed on the operative surface 14 over the connection end 22 of the fibre 21, some light will be reflected back from the object into the fibre 21 and will be returned to the detector 26. The detector 26 will thus transmit a signal to the input/output module 25. By detecting this increased level of reflected light, the input/output module 25 can detect that an object has been placed on the operative surface 14. Thus, it is envisaged that areas of the operative surface 14 are defined as control areas which may be touched by a user. It might also be envisaged that the input/output controller 25 may use this information to detect when an object is placed on the operative surface 14 and obscures a number of connection ends 22 of a plurality of fibres. Where a plurality of connection ends 22 are obscured and there is an nearby fibre 21 on which a peripheral device message has been transmitted, the input/output control may infer the size and location of that peripheral device, and will not, for example, transmit light to provide a viewable display to fibres obscured by that peripheral device 31.

The parameters of the connection device 11 and the peripheral devices 31 may be selected depending on the degree of functionality required. For example, where it is intended that the only devices to be used on the operative surface have generally low bandwidth requirements, for example a mouse, a keyboard and a set of speakers, the emitters 27, 34 may be modulated at a relatively low modulation frequency and the detectors 26, 33 selected accordingly. In the alternative where applications with greater bandwidth requirements are used, for example where a VDU 18 is placed on the communication device 11 and display instructions are transmitted to the VDU 18 then much a higher bandwidth on the order of Mbits per second, is required and at least the emitters 27 and detectors 26 must be selected accordingly.

It will further be apparent that the input/output controller 13 may be provided with any functionality as desired, up to and including the ability to function as a computer processing unit, thus removing the need for separate processor units 19 as shown in FIG. 1. The input/output controller 13 may be provided with any necessary ports, network connections, storage media, memory or any other functions as required.

Figure 7:
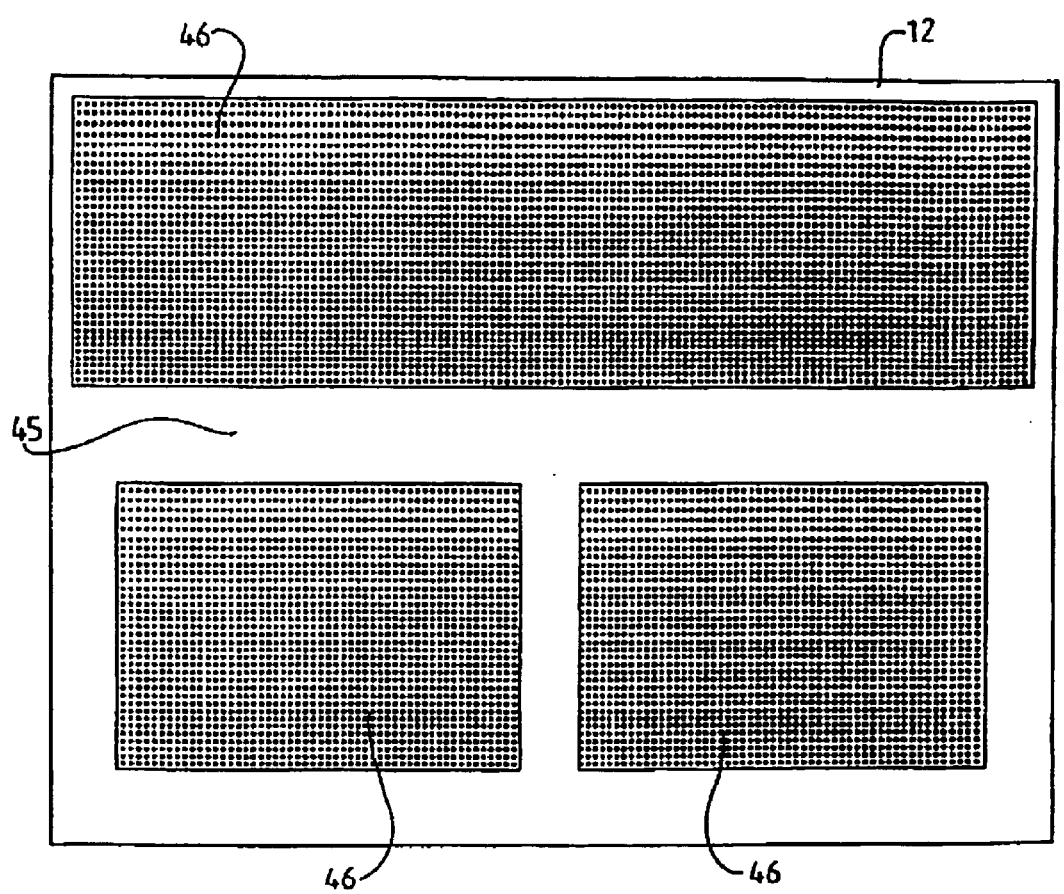

The spacing of the optical fibre connection ends 22 may be selected depending on the functionality required. If the connection part is intended only to connect peripherals, the connection ends 22 may be spaced a few millimetres apart, and optical fibres 21 with a relatively large core and large geometrical aperture may be provided such that each peripheral will only transmit and receive light from one optical fibre 21 in any given position. Where it is desired to provide an optically viewable display, the connection ends 22 must of necessity be closely spaced. Clearly, the more closely packed the optical fibre ends 22 are, the greater the number of fibres 21 and hence the greater number of detectors 26, emitters 27 and processing power of the input/output module 25 required in the input/output controller 13. It might be envisaged that the connection part 12 be provided with areas of relatively low density of optical fibre connection ends 22 to provide for communication between peripheral devices 31, and an area where connection ends 22 are more densely packed to provide an optically viewable display area. Indeed, as shown in FIG. 7, some areas 45 of the connection part 12 may have no fibre connection ends 22 and the fibre connection ends 22 may be located in one or more defined areas or "hot spots" 46.

Figure 8:
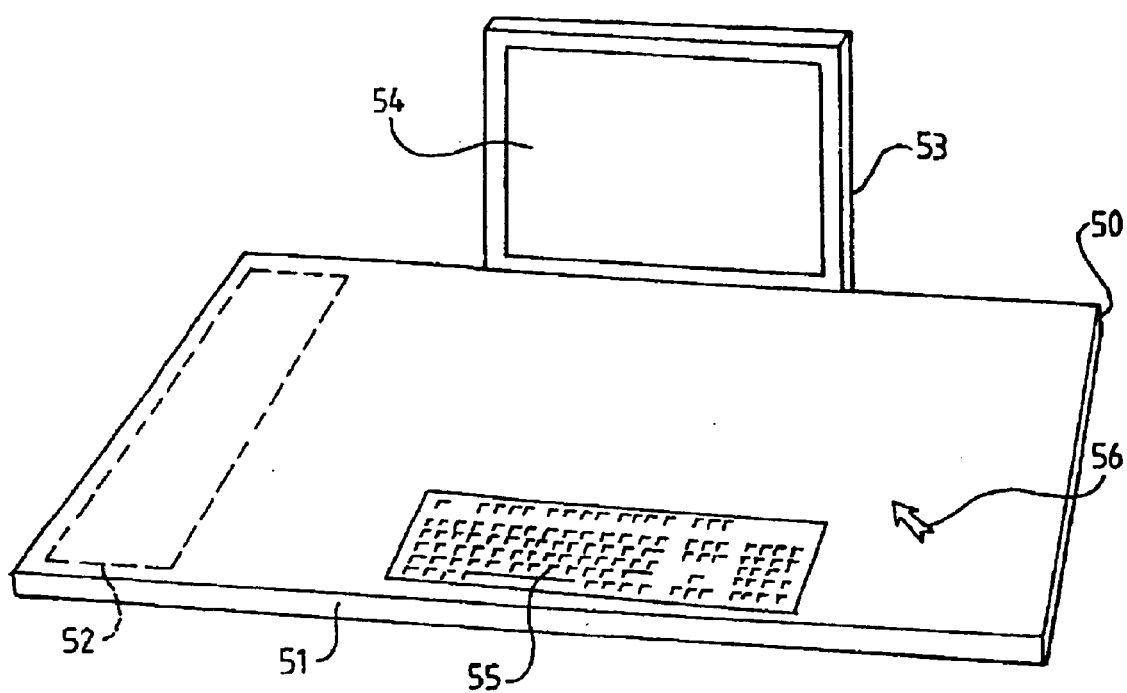
FIG. 8 is a perspective view of a further computer system embodying the present invention.

In a particular embodiment of the invention, it might be envisaged that the connection part 12 may take the place of some or all of the peripheral devices 31. As illustrated in FIG. 8, a computer generally illustrated at 50 comprises a connection part 51 in like manner to the connection part 12 and an embedded processor 52 which includes the functionality of the input/output controller 13. A display part 53 of the connection part 51 provides a dedicated viewable optical display area 54, taking the place of the visual display unit 18. The processor 52 is further operable to generate a viewable display on the connection part 51 which in this instance comprises a keyboard layout 55 and a pointer display 56. By detecting touches on the operative surface of the connection part 51, for example by detecting reflected light as hereinbefore described, the processor 52 may detect touches on each "key" of the keyboard display 55. The pointer 56, might be moved over the connection part 51 by movement of a finger placed over the pointer 56. In this manner, a flexible and foldable computer is provided which could for example be rolled up for transport by a user, laid out on a desktop or table or otherwise used as desired is provided. The computer 50 may retain the capability to communicate with peripheral devices 31 placed on the connection part 51, such that, for example, speakers 17 may be placed on the connection part 51 to provide an audio output.

It will also be apparent that a peripheral device 31 may not have a light detector if required. For example, it might be envisaged that a mouse 16 is operable purely to transmit a message comprising an identifier at regular intervals and is not responsive to light transmitted from the input/output controller 13.

Peripheral devices 31 placed on the connection part 11 may be powered by batteries or otherwise as desired. It might be envisaged that an electrical conductor be embedded in the connection part 12, and that each peripheral device 31 may be inductively coupled to the electrical conductor to draw power therefrom. Where the peripheral device 31 is a low-power device, the device could be powered from the light transmitted by the optical fibres 21, for example by using the current from a photoelectric device illuminated with light from the fibre 21.

Although in the description herein the connection part 12 comprises a plurality of fibres where each fibre extends between a single connector end and a single output end, it might be envisaged that an optical fibre may be provided with multiple output ends through which light can be coupled into and out of the fibre. Where it is desired to provide a viewable display, it will be apparent that it is preferable to have each optical fibre with a single output end, but where the connection part 12 is purely operable to provide connection between peripheral devices, it might be that each message transmitted to a peripheral device is provided with a header comprising a peripheral identifier wherein each peripheral device would only respond to a message bearing its identifier. Under such circumstances, it will of course be necessary to avoid cross-talk between messages transmitted by peripheral devices simultaneously from the same fibre.

Although it is envisaged that the connection part 12 preferably comprises a flexible element, it will be apparent that a connection part 12 could be built into or otherwise embedded in a piece of furniture, for example a physical desk top such that the peripheral devices 31 may be located anywhere on the desktop.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A connection device for a computer comprising a connection part and an input/output controller, the connection part comprising a plurality of optical fibres embedded in a substrate, each optical fibre extending from a first end associated with an operative surface of the connection part to a second end, the operative surface of said connection part being of a sufficient size to physically support said at least one peripheral device and to permit lateral movement of said at least one peripheral device on said operative surface, the input/output controller comprising a plurality of light detectors and a plurality of light emitters, wherein the second end of each optical fibre is associated with at least one light emitter and/or at least one light detector, and wherein the input/output controller is operable to receive a message from the at least one peripheral device when physically disposed upon the operative surface, the message being transmitted via the connection part, the message comprising an identifier associated with the at least one peripheral device.

2. A connection device according to claim 1 wherein the input/output controller is operable to record the peripheral device identifier and the optical fibre on which the message was transmitted.

3. A connection device according to claim 2 wherein the input/output controller is operable to derive the physical location of the peripheral device on the operative surface of the connection part.

4. A connection device according to claim 2 wherein the input/output controller is operable to transmit an output to the peripheral device by controlling a light emitter to transmit the output on the optical fibre associated with the peripheral device.

5. A connection device according to claim 2 wherein the input/output controller is operable to derive the physical location of the at least one peripheral device on the operative surface of the connection part as the at least one peripheral device is laterally moved on said operative surface from said first location to said second location.

6. A connection device according to claim 5 wherein said operative surface is both planar and continuous at least between said first location and said second location.

7. A connection device according to claim 1 wherein the input/output controller is operable to maintain a mapping between each identifier associated with a peripheral device and an optical fibre associated with that device.

8. A connection device according to claim 7 wherein the input/output controller is operable to update the mapping in response to a change in position of the peripheral device on the operative surface.

9. A connection device according to claim 1 wherein the input/output device is operable to detect an object adjacent the operative surface by transmitting light on one or more optical fibres and detecting light reflected from an object adjacent the operative surface received on said optical fibres.

10. A connection device according claim 1 wherein the substrate is flexible.

11. A connection device according to claim 1 wherein said operative surface is both planar and continuous at least between said first location and said second location.

12. A connection device according to claim 1 wherein said operative surface communicates concurrently with a plurality of peripheral devices disposed thereon.

13. A connection device according to claim 1 wherein said at least one peripheral device disposed on said operative surface is a computer mouse.

14. A connection device according to claim 1 wherein said at least one peripheral device disposed on said operative surface is a visual display unit.

15. A connection device according to claim 1 wherein said at least one peripheral device disposed on said operative surface is a keyboard.

16. A connection device according to claim 1 wherein the input/output controller is operable to control a plurality of light emitters to transmit light along a plurality of optical fibres to generate a user viewable optical display.

17. A connection device for a computer comprising a connection part and an input/output controller, the connection part comprising a plurality of optical fibres embedded in a substrate, each optical fibre extending from a first end associated with an operative surface of the connection part to a second end associated with the input/output controller, wherein the input/output controller is operable to control a plurality of light emitters to transmit light along a plurality of optical fibres to generate a user viewable optical display.

18. A connection device according to claim 17 wherein the user viewable display unit is physically supported by said operative surface.

19. A peripheral device for location adjacent an operative surface, the peripheral device being laterally moveable on said operative surface between first and second spaced-apart locations thereon and comprising a light emitter operable to emit light towards the operative surface when the peripheral device is adjacent to the operative surface, the peripheral device being operable said first and second locations transmit a message by modulating the light emitted by the light emitter, the message including an identifier identifying the peripheral device.

20. A peripheral device according to claim 19, the peripheral device comprising a light detector operable to detect light emitted from said operative surface when the peripheral device is adjacent the operative surface.

21. A computer system comprising a connection device according to claim 1 and including said at least one peripheral device disposed on said operative surface, the at least one peripheral device comprising said light emitter operable to emit light towards the operative surface when the peripheral device is adjacent to the operative surface, the peripheral device being operable to transmit a message by modulating the light emitted by the light emitter, the message including an identifier identifying the peripheral device.

22. A computer system according to claim 21 wherein the computer comprises a processor and wherein the processor is embedded in the connection device.

23. A computer system according to claim 21 comprising a plurality of said peripheral devices, the input/output controller being operable to receive a message from one of said peripheral devices, the message comprising destination information identifying a further peripheral device, read the destination information and identify the optical fibre corresponding to the further peripheral device, and transmit the message to the further peripheral device.

24. A computer system according to claim 21 wherein said at least one peripheral device has a detector disposed laterally of said light emitter, the detector and emitter being spaced from an end of an optical fibre disposed in said operative surface, but both said detector and said light emitter being positioned within a cone of acceptance associated with said optical fibre.

25. A connection device for coupling a computer and at least one computer peripheral, the device comprising:
a connection part and an input/output controller, the connection part comprising a plurality of optical fibres embedded in a substrate, each optical fibre extending from a coupling end associated with an operative surface of the connection part to a connection end,
the input/output controller comprising a plurality of light detectors and a plurality of light emitters, wherein the connection end of each optical fibre is associated with at least one light emitter and/or at least one light detector,
wherein the input/output controller is operable to receive a message from the least one peripheral device physically disposed upon the operative surface in one of a plurality of different possible locations thereon, and
wherein the input/output controller is operable to determine which one of said plurality of different possible locations on said the at least one peripheral device is disposed upon.

26. A connection device according to claim 25 wherein the input/output controller is operable to derive the physical location of the at least one peripheral device on the operative surface of the connection part as the at least one peripheral device is laterally moved on said operative surface from a first location thereon to a second location thereon.

27. A connection device according to claim 25 wherein said operative surface communicates concurrently with a plurality of peripheral devices disposed thereon.

28. A connection device for coupling a computer system with at least one peripheral device, the connection device comprising:
an operative surface for supporting said at least one peripheral device while said at least one peripheral device is operatively coupled to said computer device, said operative surface allowing the at least one peripheral device to move laterally on said operative surface;
a two dimensional array of optical fibres arranged adjacent said operative surface for data communication with said at least one peripheral device, said at least one peripheral device being disposed adjacent at least one optical fibre in said array when said at least one peripheral device is supported on said operative surface; and
an input/output controller for determining the at least one optical fibre in said array that the least one peripheral device is disposed adjacent and for coupling the least one peripheral device to said computer system via the at least one optical fibre in said array.

* * * * *

UNITED STATES PATENT AND TRADEMARK OFFICE
CERTIFICATE OF CORRECTION

PATENT NO.    : 6,839,780 B2
DATED         : January 4, 2005
INVENTOR(S)   : Gavin Brebner et al.

It is certified that error appears in the above-identified patent and that said Letters Patent is hereby corrected as shown below:

Column 9,
Lines 43-44, change "locations transmit" to -- locations to transmit --.

Signed and Sealed this

Sixteenth Day of August, 2005

JON W. DUDAS
*Director of the United States Patent and Trademark Office*